United States Patent Office 3,250,392
Patented May 10, 1966

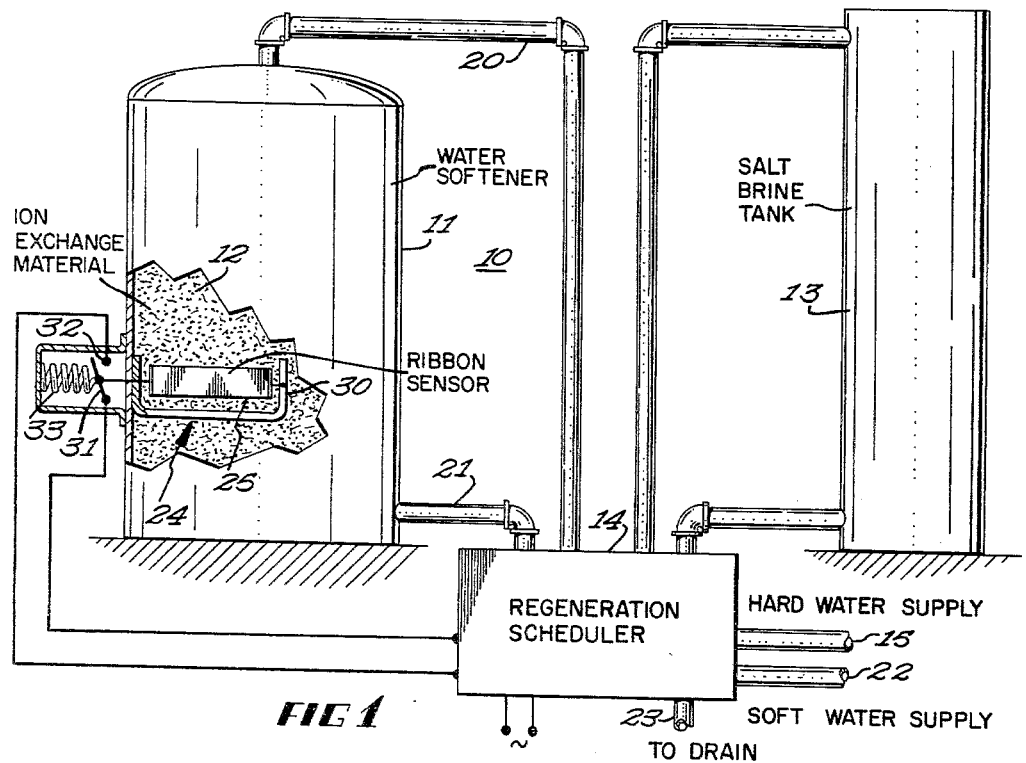
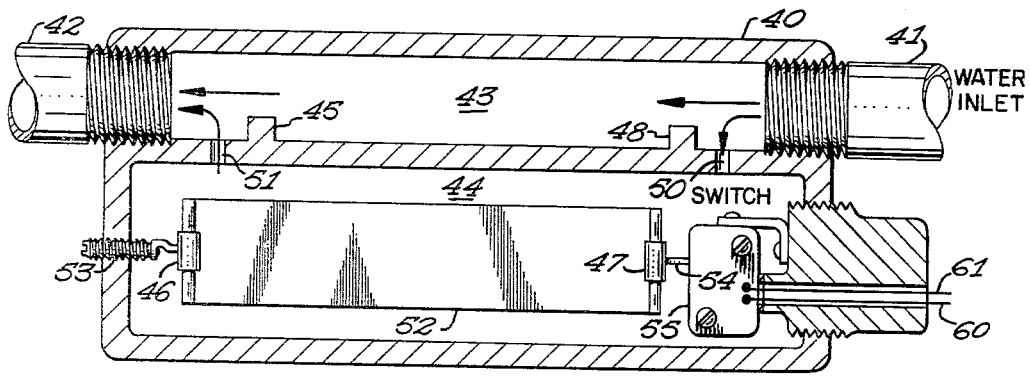
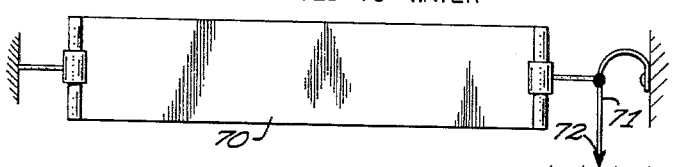

3,250,392
WATER SOFTENER SYSTEM CONTROL
APPARATUS
James R. Luck, Minneapolis, Minn., assignor to Honeywell Inc., a corporation of Delaware
Filed Feb. 17, 1964, Ser. No. 345,382
9 Claims. (Cl. 210—96)

The present invention is concerned with an improved water softener control system. In particular, an improved sensor is mounted to be exposed to the conditioned water from a water softener; so that, upon a change in length of the sensor material which takes place as the ion content of the water changes, a regeneration of the water softener bed is accomplished.

Many control systems have been provided for controlling the regeneration of a domestic water softener. Of these systems such as a time cycle, a water quantity measuring device, and others, the initial cost of the apparatus as well as the cost of installation makes such apparatus generally unavailable to the domestic market. In automatic systems having a water condition sensor to initiate a regeneration cycle, the success of operation depends on the sensing means. A need has existed for several years for an inexpensive and yet reliable sensing means which will provide an output signal indicative of the need of regeneration of the ion exchange material in a water softener.

In the present invention a ribbon type sensor which changes in length when exposed to hard water is mounted either in the tank of ion exchange material or connected in such a manner to be exposed to the water flowing from the ion exchange material tank. After the softening characteristic of the ion exchange material is depleted the unsoftened or hard water acts on the improved sensor to provide an output signal which can be used to initiate the regeneration cycle.

An object of the present invention is to provide an improved water softener control sensing means for initiating the regeneration cycle when the ion exchange material of the softener becomes depleted of its water softening characteristic making use of the change in length of an ion responsive material.

Another object of the present invention is to provide an improved water softener control making use of a ribbon type sensor which changes in length when exposed to hard water to provide an output for initiating regeneration cycle.

These and other objects of the present invention will become apparent upon a study of the following specification and drawing of which FIGURE 1 is a schematic representation of a typical water softener system having a tank of ion exchange material which can be regenerated by the flow of salt water obtained from a salt brine tank. A ribbon sensor mounted in the tank of the ion exchange material controls the operation of a switch of initiating energization of a regeneration schedule.

FIGURE 2 is one embodiment of the water softener control using the ribbon sensor wherein the flow of water from a source is used to expose the sensor.

FIGURE 3 is another embodiment of the sensor for providing an indication output.

Referring to FIGURE 1, a water softener control system 10 has a main tank 11 containing ion exchange material or Zeolite pellets 12. A salt brine tank 13 contains common salt so upon the flow of water through tank 13, salt water is obtained for regenerating ion exchange material 12. The tank 11 and tank 13 are connected in a conventional manner by a regeneration scheduler 14 to provide a conventional regeneration operation of the water softener which is quite familiar to one skilled in the art as shown in the expired United States Patent 2,012,194 to Walter J. Hughes on August 20, 1935. During normal operation, hard water is supplied to pipe 15 to flow through pipe 20 into the top of tank 11 to pass down to the ion exchange material and through pipe 21 to pipe 22 to provide a supply of soft water. The "hard ions" in the hard water are replaced by the "soft ions" from the ion exchange material. Upon the energization of the regeneration scheduler 14, a series of valving operations are accomplished to back wash and recharge the ion exchange material in tank 11. The recharging portion of the cycle connects the supply of salt water from tank 13 to tank 11 by connecting the supply of hard water to tank 13 so the salt water flows through tank 11 to the drain 23.

Mounted in tank 11 is a sensor 24 which comprises a thin ribbon, membrane or length of material 25 mounted at one end thereof to a bracket 30 which is attached to the tank and connected at the other end to a movable member 31 of a switch which can be closed to engage a contact 32. Ribbon 25 is biased to the left to hold the switch open by a spring 33. Ribbon 25 is a thin membrane of material which changes in length depending upon the ion content. When the ribbon is exposed to soft water of a "soft ion" content, the ribbon is in its longest length; however, when the ribbon is exposed to water containing "hard ions" the ribbon shrinks a predetermined amount. Basically the ribbon material is known as a "Graft Copolymer" of polyethylene and divinyl benzene which is sulfonated to provide fixed anionic sites and is commercially available from the American Machine and Foundry Co. as the C–60 Cation Membrane.

When ribbon 25 is mounted in the water softener tank 11, the ribbon can be directly exposed to ion exchange material 12 or the ribbon can be protected to not be in physical contact with the ion exchange material so the ribbon is only exposed to the water which is treated by the ion material as the water passes into the top of tank 11 and out of pipe 21. When ribbon 25 contacts the ion exchange material obviously friction between the two are of some concern.

Referring to FIGURE 2, another embodiment makes use of a casing or housing 40 which can be connected to a water inlet pipe 41 and a water supply pipe 42. The water inlet pipe might be the outlet 21 of tank 11 as shown in FIGURE 1. Housing 40 comprises a first chamber 43 and a second chamber 44. As the water passes from inlet 41 to outlet 42, the majority of the water passes through chamber 43. A pair of projections 45 and 48 which are mounted adjacent holes 50 and 51 connecting chambers 43 and 44 respectively provide a restriction in the passageway for the water through chamber 44 and thus an increase in pressure so a portion of the water flow exists through chamber 44. A ribbon 52 of the type described in connection with ribbon 25 of FIGURE 1 is mounted at one end of chamber 44 by an adjustable screw 53 attached to a clamp or connector 46 on the ribbon and is connected at the other end of chamber 44 to an operating member 54 of a conventional switch 55 by a similar connector 47. When ribbon 52 shrinks in size a predetermined amount, switch 55 is closed to close the electric circuit between conductors 60 and 61 protruding from the housing 40.

With such an embodiment as shown in FIGURE 2, the improved sensor can be used to control the regeneration of a water softener system without requiring that the sensor be mounted in the tank 11 as shown in FIGURE 1. With such an embodiment, only the output line or pipe of a water softener need be broken to connect the housing 40 into the water flow line. As the ion exchange material in the water softener tank becomes depleted, the water leaving the tank and thus entering inlet 41 would be hard and would affect the ribbon 52 in a manner to shorten its length and cause operation of switch 55 to begin the regeneration schedule.

Referring to FIGURE 3, ribbon 70 which is of the type described in connection with ribbons 25 and 52 could be exposed to water in some manner such as described in connection with FIGURES 1 and 2 and connected to an indicating device having resilient member 71 for adjusting a pointer 72 with respect to an applied scale 73. When ribbon 70 was exposed to hard water, the length of the ribbon would decrease to provide a proper indication of the condition of the water whereby selective operation of certain regeneration equipment could be started.

OPERATION

In the operation of the water softener control as shown in FIGURE 1 let's assume that the ion exchange material 12 is charged to have a solium ion content. As the hard water is supplied through pipe 15 to enter the upper portion of tank 11, the hard water flows through the tank. As the "hard ions" are replaced by the "soft ions" soft water is provided to flow through pipe 21 and to the soft water supply 22. As the ion exchange material 12 becomes depleted of the soft ions, the level of depletion moves downward through tank 11. When the ion exchange material around or below sensor 24 becomes exhausted, the water contacting ribbon 25 is hard and the condition of the ribbon changes so the length of the ribbon shortens to close the switch and thus member 31 engages contact 32. Material 25 becomes shorter as the soft ions in the material are replaced by hard ions.

Regeneration scheduler 14 is energized and the regeneration of the water softener or ion exchange material 12 takes place in a conventional manner in accordance with a timer schedule as determined by the particular type of regeneration scheduler. As the salt water is passed through tank 11 to recharge or replace the "hard ions" of material 12 with soft ions and the salt is subsequently washed out, ribbon 25 would expand in length to open the switch so that once the regeneration scheduler completed the regeneration cycle, the cycle would not again take place. More over, the open switch may be used to signal complete regeneration.

The operation of the embodiment of FIGURE 2 is substantially the same. The connection of housing 40 into the system of FIGURE 1 is such that when the regeneration operation took place, the ribbon 52 is exposed to salt brine or soft water. Even if such a connection was not made so the ribbon is exposed to salt brine or soft water during regeneration, as soon as the ion exchange material in the tank was recharged or regenerated, normal operation of the water softener provides soft water and as the soft water flows into housing 40, a portion of the water would pass into chamber 44 to regenerate ribbon 52 to restore the ribbon to the normal length. With such an operation ribbon regeneration is slow and the type of regeneration scheduler needed might vary; however, such is only obvious to one skilled in the art.

The operation of the sensor of FIGURE 3 is to provide an indication of the condition of the water. If the sensor is used with a water softener, a manual operation of the regeneration cycle would be accomplished when a condition indicative of a need of regeneration was indicated.

The invention has been described in one particular manner; however, the intent is to limit the scope of the present invention only to the appended claims of which I claim:

1. In a water softener control system, a tank of ion exchange material through which hard water flows from a source to provide a supply of soft water, regeneration means for regenerating the ion exchange material after the soft ions are replaced by hard ions, ribbon sensing means which changes in length upon being exposed to hard water, switch means, support means in said tank, means connecting one end of said ribbon to said support means and another end of said ribbon to said switch means whereby said ribbon is exposed to water in said tank and upon decreasing to a predetermined length said switch is closed, and circuit means connecting said switch means to control the energization of said regeneration means.

2. In a water softener control system, a tank of ion exchange material through which hard water flows from a source to provide a supply of soft water, regeneration means for regenerating the ion exchange material after the soft ions are replaced by hard ions, a source of power, ribbon sensing means which decreases in length upon being exposed to hard water, switch means, support means in said tank, means connecting one end of said ribbon between said support means and said switch means whereby said ribbon is exposed to the ion exchange material and water in said tank, said switch means being closed when said sensing means decreases to a predetermined length, and circuit means including said switch means for connecting said source of power to energize said regeneration means.

3. In a water softener control system for controlling the initiation of a regeneration cycle when water in a tank of ion exchange material becomes hard, a length of sensing material mounted in the tank to be exposed to the water therein, said sensing material changing to a predetermined length when the water to which said material is exposed reaches a predetermined level of hardness, control means adapted to initiate the regeneration cycle, and means connecting said sensing means to said control means to energize said control means when said predetermined length is attained.

4. In a control device adapted to initiate a regeneration operation for ion exchange material in a water softening system, a ribbon sensing element changing to a predetermined length after being exposed to soft water and then to hard water, and responsive means connected to said element to respond to said predetermined length.

5. A control device adapted to initiate a regeneration operation for ion exchange material in a water softening system comprising, ribbon sensing means changing to a predetermined length when being exposed to hard water, and control means connected to said sensing means to respond to said predetermined length.

6. A control device adapted to control the regeneration of a water softener comprising,
   a piece of material changing in length when exposed to water having a predetermined hardness, said material being a graft copolymer of polyethylene and divinyl benzene which is sulfonated to provide fixed anionic sites, and
   first means connected to respond to said length of said material, said first means having an output indicative of said predetermined hardness.

7. In a device adapted to respond to the hardness condition of water,
   a housing having a main water flow chamber and a second chamber, said main chamber being adapted to be connected to a supply of water, said chambers being connected whereby upon water flowing through said main chamber a proportional amount of water flows through said second chamber,
   a sensing element mounted in said second chamber, said element changing to a predetermined length as the water surrounding said element changes from one hardness level to another,
   and means contained in said housing connected to respond to said predetermined length of said element.

8. A device adapted to respond to the hardness condition of water comprising, a housing having a main water flow chamber and a second chamber, said main chamber being adapted to be connected to a supply of water so water flows through said main chamber, said chambers being connected by at least two passageways whereby upon water flowing through said main chamber a proportional amount of water flows through said second chamber, responsive means mounted in said second chamber, said responsive means changing to a predetermined length as the water surrounding said responsive means changes from one hardness level to another, and means contained in said housing connected to respond to said predetermined length of said responsive means.

9. In a water softener control system for controlling the initiation of a regeneration cycle when water in a tank of ion exchange material becomes hard, a length of sensing material mounted to be exposed to water having a hardness representative of the hardness of water in said tank, said sensing material decreasing to a predetermined length when water to which said material is exposed increases a predetermined level of hardness, control means adapted to initiate the regeneration cycle, and means connecting said sensing material to said control means to energize said control means when said predetermined length is attained.

References Cited by the Examiner

UNITED STATES PATENTS

| | | | |
|---|---|---|---|
| 2,209,487 | 7/1940 | Wagner | 210—96 X |
| 2,681,320 | 6/1954 | Bodamer | 204—296 X |
| 2,736,637 | 2/1956 | Juda | 210—96 X |
| 2,810,692 | 10/1957 | Calmon | 210—108 X |
| 2,921,005 | 1/1960 | Bodamer | 204—296 X |
| 3,172,037 | 3/1965 | Pfeiffer | 210—85 X |

REUBEN FRIEDMAN, *Primary Examiner.*

D. M. RIESS, *Assistant Examiner.*